United States Patent
Lioy et al.

(10) Patent No.: US 6,483,822 B1
(45) Date of Patent: *Nov. 19, 2002

(54) ESTABLISHING A PACKET NETWORK CALL BETWEEN A MOBILE TERMINAL DEVICE AND AN INTERWORKING FUNCTION

(76) Inventors: Marcello Lioy, 7588 Charmant Dr., #1924, San Diego, CA (US) 92122; Nischal Abrol, 7260 Calle Cristobal, #41, San Diego, CA (US) 92126

( * ) Notice: Subject to any disclaimer, the term of this patent is extended or adjusted under 35 U.S.C. 154(b) by 0 days.

This patent is subject to a terminal disclaimer.

(21) Appl. No.: 09/327,102

(22) Filed: Jun. 7, 1999

(51) Int. Cl.[7] .............................. H04Q 7/00; H04Q 7/20
(52) U.S. Cl. ........................................ 370/329; 455/450
(58) Field of Search ................................. 370/229, 230, 370/328, 329, 465, 468, 231, 235, 310, 335, 336, 342, 343, 345, 351, 389, 400; 209/227, 228, 229, 231, 234; 455/450

(56) References Cited

U.S. PATENT DOCUMENTS

| | | | | |
|---|---|---|---|---|
| 5,708,655 | A | * 1/1998 | Toth et al. | 370/313 |
| 6,111,866 | A | * 8/2000 | Kweon et al. | 370/335 |
| 6,230,012 | B1 | * 5/2001 | Willkie et al. | 455/435 |
| 6,349,224 | B1 | * 2/2002 | Lim | 455/428 |
| 6,370,118 | B1 | * 4/2002 | Lioy et al. | 370/235 |
| 6,377,556 | B1 | * 4/2002 | Lioy et al. | 370/310 |
| 6,385,195 | B2 | * 5/2002 | Sicher et al. | 370/328 |

FOREIGN PATENT DOCUMENTS

| | | | |
|---|---|---|---|
| EP | 0917328 | 10/1998 | H04L/29/06 |
| WO | 9748246 | 12/1997 | H04Q/7/22 |

OTHER PUBLICATIONS

W. Simpson, "The Point to Point Protocol (PPP)" Online, Jul. 1994, pp. 1–47.

* cited by examiner

Primary Examiner—Kwang Bin Yao
Assistant Examiner—Kevin C. Harper
(74) Attorney, Agent, or Firm—Philip Wadsworth; Charles D. Brown; Bruce W. Greenhaus

(57) ABSTRACT

A method or system establishes a packet network call over a transmission link extending between a mobile terminal device and an interworking function which comprises a gateway or bridge connection to a network, such as a packet network. The transmission link connects the mobile terminal device to a wireless communication device over a first interface and further connects the wireless communication device to the interworking function over a second interface via a wireless link to a base station. The packet network call, once established, comprises a first interface data link formed within a predetermined data link layer across the first interface and a second interface data link formed within the predetermined data link layer across the second interface. A flow control is asserted and deasserted on the mobile terminal device. During the flow control, the wireless communication device performs a link control protocol negotiation with the interworking function to establish the second interface data link with the interworking function. After the second interface data link is established, and during the flow control, the wireless communication device performs a network control protocol negotiation with the interworking function to establish a second interface network link carried by the second interface data link. This results in an IP address being assigned to identify the mobile terminal device. After the second interface data link is established, the mobile terminal device performs a link control protocol negotiation with the wireless communication device to establish the first interface data link with the wireless communication device. After the first interface data link and the second interface network link are each established, the mobile terminal device performs a network control protocol negotiation with the wireless communication device to establish a first interface network link carried by the first interface data link, using an IP address obtained from a network control protocol negotiation with the interworking function.

13 Claims, 5 Drawing Sheets

ESTABLISHING A PACKET NETWORK CALL BETWEEN A MOBILE TERMINAL DEVICE AND AN INTERWORKING FUNCTION

BACKGROUND OF THE INVENTION

1. Field of the Invention

The present invention relates to protocols and systems for establishing a packet switched network model connection between a mobile terminal device and a packet network via a wireless connection formed between a wireless communication device and a base station.

2. Description of Background Information

Mobile computing generally involves the use of mobile terminal devices such as notebook computers connected to computing resources via a wireless communication device. As mobile computing becomes more prevalent, traveling users will be provided continuous connectivity, and thus full access, to their computing resources—data and files stored at their office LAN, email servers, etc. To make this a reality, efforts abound to develop and introduce new data services and technologies.

FIG. 1 is a block diagram of a simplified network reference model applicable to mobile computing data services. The model shows select network entities forming a communications subsystem 10. A mobile terminal device 12 is coupled to a wireless communication device 14, which is in turn connected to a base station/mobile switching center 16 via a wireless interface. Base station/mobile switching center 16 is connected to an interworking function 18. The simplified network reference model is described in the document entitled "Data Service Options for Wideband Spread Spectrum Systems," TIA/EIA/IS-707, Published Version (February 1998), (hereinafter referred to as "IS-707") as well as in the newer version thereof, i.e., IS-707-A. The content of each of IS-707 and IS-707-A is hereby expressly incorporated by reference herein in its entirety.

According to IS-707, mobile terminal device 12, wireless communication device 14, base station/mobile switching center 16, and interworking function 18 are respectively referred to as a TE2 device, an MT2 device, a BS/MSC, and an IWF. The interface between mobile terminal device 12 and wireless communication device 14 is called an Rm interface. The interface between wireless communication device 14 and base station/mobile switching center 16 is referred to as a Um interface. The interface between base station/mobile switching center 16 and interworking function 18 may be implemented with an L interface.

Mobile terminal device 12 may comprise, for example, a notebook computer, a personal digital assistant, or any other computing device capable of computer network communications, including packet-based communications or communications via a dial-up modem. Wireless communication device 14 may comprise, for example, a wireless terminal used by subscribers to access network services over a radio link. The wireless terminal may comprise a hand-held cellular telephone, or a unit installed in a vehicle. Wireless communication device 14 may also be fixed to a particular location.

Base station/mobile switching center 16 is shown in FIG. 1 as a single functional entity, although it need not be. The base station portion of the illustrated base station/mobile switching center allows wireless communication device 14 to access network services using a radio link or another type of wireless link. The mobile switching center portion handles the switching of traffic between the wireless link and a telecommunications network to which the wireless link is connected. The telecommunications network may comprise one or a combination of PSTN, ISDN, internet routers, and other network types and network entities.

Interworking function 18 represents the point at which a gateway or bridge connection is formed between mobile terminal device 12 and/or wireless communication device 14 at one end and an internetwork at the other end.

FIG. 2 is a simplified diagram of a protocol stack adhered to by many mobile computing environments, including those adhering to IS-707, RFC 1332, "The PPP Internet Protocol Control Protocol (IPCP)" (May, 1992), RFC 1661, "The Point-To-Point Protocol (PPP)" (July, 1994), and RFC 2002, "IP Mobility Support" (October, 1996). The stack comprises one or more lower layer(s) 28, a data link layer 26, a network layer 24, and one or more upper layers 22. One or more lower layers 28 are provided, including, at the lowest layer, connections establishing a physical link. The relay layer disclosed in IS-707 is included in these lower layers above the physical layer.

Data link layer 26 is immediately above lower layer(s) 28. Data link layer 26 may utilize such protocols as PPP and/or SLIP. This layer deals with point-to-point communications between computers. It packages addressing data and manages the flow of transmissions. PPP (the point-to-point protocol) is described, for example, in RFC 1332 (May, 1992), the content of which is hereby expressly incorporated by reference herein in its entirety. PPP facilitates the transmission of datagrams between data communications equipment from different manufacturers over dial-up and dedicated serial point-to-point links. PPP can simultaneously transmit multiple protocols across a single serial link, without the need to set up a separate link for each protocol. PPP also allows the interconnection of dissimilar devices, such as host bridges and routers, over serial links. The PPP protocol is comprised of three main components, including an encapsulation scheme, a link control protocol, and network control protocols. These components are respectively responsible for creating the frame, controlling the link, and managing the network layer protocol.

Network layer 24 is just above data link layer 26, and may comprise such protocols as IP or CLNP. The network layer ensures that information arrives at its intended destination. That is, it is concerned with the actual movement of information from one network entity to another. The network layer is responsible for getting data from one computer to another. The internet protocol (IP) breaks up data messages into packets, routes the packets from a sender to a destination network entity, and reassembles the packets into the original data messages at the destination. The IP protocol contains an IP header which contains source and destination address fields that uniquely identify host computers respectively acting as the source and destination of the packets being transferred.

Upper layer(s) portion 22 comprises one or more protocol layers above network layer 24, including, for example, the TCP (transmission control protocol) protocol which is responsible for reliable, in-order delivery of data from one application to another.

Two types of mobile data calls may be placed by a mobile terminal device 12 through a wireless communication device 14: circuit switched (including fax calls) and packet switched. In a circuit switched mobile data call, a circuit switched connection is made between mobile terminal device 12 and a given target network. Mobile terminal device 12 makes this connection by establishing a dial-up modem connection directly over a circuit switched network to a modem-accessible target network—e.g., to an internet service provider (ISP) or to an office network or LAN. In a packet switched call, a direct connection is established between mobile terminal device 12 at one end and a packet network at the other end through interworking function 18.

There are generally two modes of operation in which packet switched calls can be placed: the network model and the relay model. In a relay model packet call, a packet switched connection is made between mobile terminal device 12 and the network through interworking function 18, while wireless communication device 14 acts as a conduit, at the physical layer. Accordingly, if there is a change in the connection between interworking function 18 and wireless communication device 14 (e.g., the physical link therebetween is temporarily interrupted), the call may be dropped between mobile terminal device 12 and interworking function 18.

On the other hand, in a network model packet call, two separate PPP links are provided at the data link layer: a first interface data link is formed within the data link layer across the Rm interface, and a second interface data link is formed within the data link layer across the Um interface (as well as across the L interface). The separate PPP links help support "transparent mobility;" that is, the mobile terminal device 12 does not need to know when its location changes so as to affect the link between wireless communication device 14 and interworking function 18. In other words, the network model mode of operation prevents changes over the Um link from affecting the Rm link, as the Rm link is isolated from the Um link. This helps with the support of transparent mobility. Another benefit is that the TE2 is protected from arbitrary PPP renegotiations.

The establishment of separate and isolated PPP links at the data link layer over the Rm and the Um interfaces is only part of what is necessary to support transparent mobility. A network layer connection must also be established between mobile terminal device 12 and interworking function 18 at the network layer in a way that still supports transparent mobility.

3. Definitions of Acronyms and Terms

The following term and acronym definitions are provided to assist the reader in obtaining an understanding of the invention as described herein.

Flow Control: Performed by the receiving entity to limit the amount or rate of data sent to it by a transmitting entity or to ignore messages it receives while keeping the transmitting entity unaware that it is being ignored.

Interworking Function (IWF): A point at which a gateway or bridge connection is form ed between a given network (e.g., a packet network) and mobile devices coupled to the network by way of a base station and/or a mobile switching center.

SUMMARY OF THE INVENTION

In view of the above, the present invention, through one or more of its various aspects and/or embodiments, is thus presented to bring about one or more objects and advantages. One such object is to provide mechanisms and protocols which facilitate the establishment of a packet link between a mobile terminal device and a network via an interworking function, while supporting transparent mobility so that changes over the Um link do not affect the Rm link. A further object of the present invention is to provide such mechanisms and protocols which also allow for IP mobility support.

The present invention, therefore, is directed to a system or a method for establishing a packet network call over a transmission link extending between a mobile terminal device and an interworking function. The transmission link connects the mobile terminal device to a wireless communication device over a first interface, and further connects the wireless communication device to the interworking function over a second interface via a wireless link to a base station. The packet network call, once established, comprises a first interface data link formed within a data link layer across the first interface and a second interface data link formed within the data link layer across the second interface. A flow control is asserted and deasserted on the mobile terminal device, and during the flow control, the wireless communication device performs a link control protocol negotiation with the interworking function to establish the second interface data link with the interworking function. After the second interface data link is established, and during the flow control, the wireless communication device performs a network control protocol negotiation with the interworking function entity to establish a second interface network link carried by the second interface data link, resulting in an IP address being assigned to identify the mobile terminal device. After the second interface data link is established, the mobile terminal device performs a link control protocol negotiation with the wireless communication device to establish the first interface data link with the wireless communication device. After the first interface data link and the second interface network link are each established, the mobile terminal device performs a network control protocol negotiation with the wireless communication device to establish a first interface network link carried by the first interface data link, utilizing the same IP address assigned during the network control protocol negotiation with the interworking function.

Other acts are performed after the first interface and the second interface network link are each established, when the wireless communication device receives a request for a static IP address from the mobile terminal device. A determination is made as to whether mobile IP is supported by the packet network, and when mobile IP is not supported, the other acts are not performed. During a flow control on the mobile terminal device, the wireless communication device performs a network control protocol renegotiation with the interworking function to reestablish the second interface network link carried by the second interface data link using the static IP address. A network protocol negotiation is thereafter performed between the mobile terminal device and the wireless communication device to establish the first interface network link using the static IP address.

BRIEF DESCRIPTION OF THE DRAWINGS

The present invention is further described in the detailed description which follows, by reference to the noted plurality of drawings by way of non-limiting examples of embodiments of the present invention, in which like reference numerals represent similar parts throughout the several views of the drawings, and wherein.

DETAILED DESCRIPTION OF THE EXEMPLARY EMBODIMENTS

The present invention concerns itself with the establishment of a data link layer link (a data link) and a network layer link (a network link) between mobile terminal device 12 and interworking function 18. In the illustrated embodiment, each of these links is formed using the PPP protocol. The PPP protocol comprises an initial link establishment phase, during which a data link is established using a link control protocol (LCP), and a network layer protocol phase, during which a network link is established using a network control protocol (NCP).

As described in RFC 1661, during the initial link establishment phase, LCP packets are exchanged between the two entities between which a data link is to be established. The LCP packets comprise a Configure-Request packet, a Configure-Ack packet, a Configure-Nak packet, and a Configure-Reject packet. The format of these packets is well known and described in RFC 1661.

The Configure-Request packet is used to negotiate configuration options. The Configure-Ack packet is transmitted if every configuration option in a received Configure Request packet is recognizable and all values are acceptable. The Configure-Nak packet is sent in response to a Configure-Request packet when the requested configuration options are recognizable, but some of the values are not acceptable. The Configure-Nak packet comprises an Options field which is filled only with the unacceptable configuration options requested by the Configure-Request packet The Configure-Reject packet is sent when a received Configure-Request packet includes configuration options that are unrecognizable or are not acceptable for negotiation. The Configure-Reject packet comprises an Option field which contains only the unacceptable configuration options from the Configure-Request packet During the subsequent network layer protocol phase, NCP packets are exchanged between the two entities between which a network link is to be established. The internet protocol control protocol (IPCP) is a network control protocol, responsible for configuring, enabling, and disabling an internet protocol (IP) network link. The IPCP network control protocol is described in RFC 1332. IPCP configuration options include IP-address and IP-compression-protocol. An IPCP negotiation uses the same type of configure packet negotiation mechanism as that described above for LCP. Accordingly, an IPCP negotiation utilizes packets including a Configure-Request packet, a Configure-Ack packet, a Configure-Nak packet and a Configure- Reject packet. The results of the IPCP negotiation include both IP-compression-protocol configuration information as well as an IP address to be used on the local end of the link The sender of a Configure-Request states which IP-address is desired or requests that the peer provide it an IP address. The peer can provide this information by NAKing the option, and returning a valid IP-address.

Figure 1:
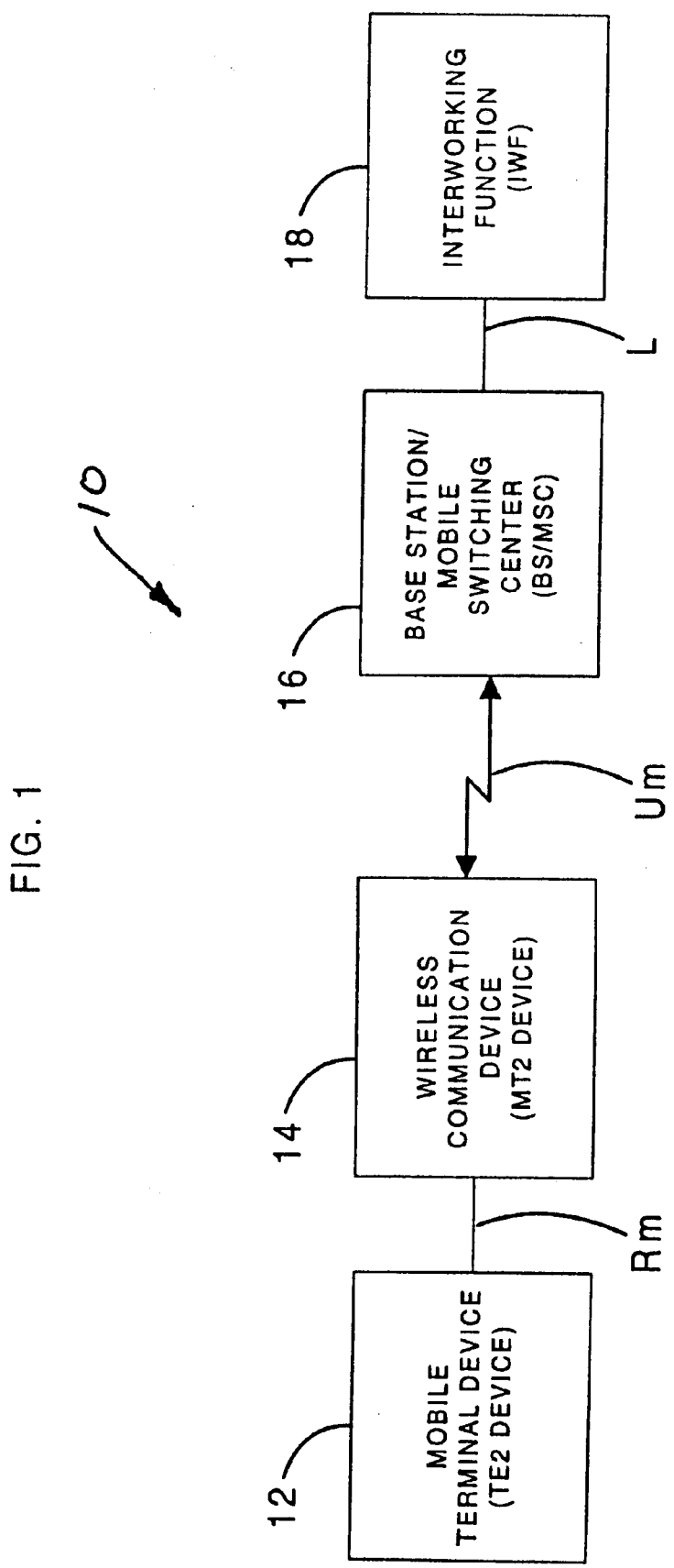
FIG. 1 is a block diagram of a mobile computing communications subsystem.
Figure 2:
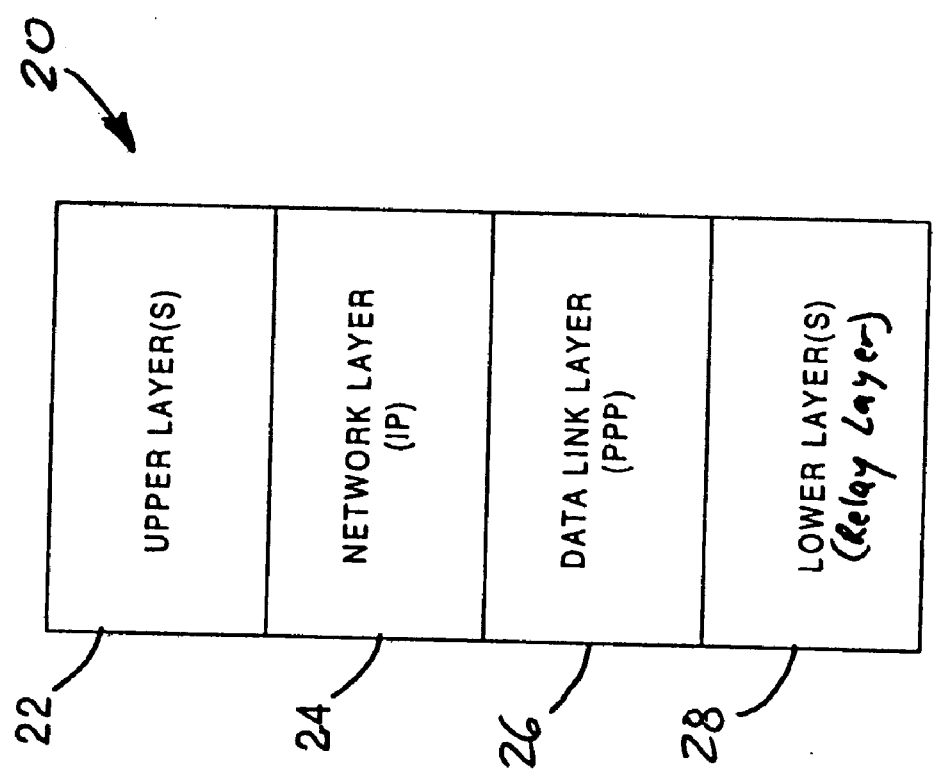
FIG. 2 is a simplified diagram of a protocol stack structure.
Figure 3:
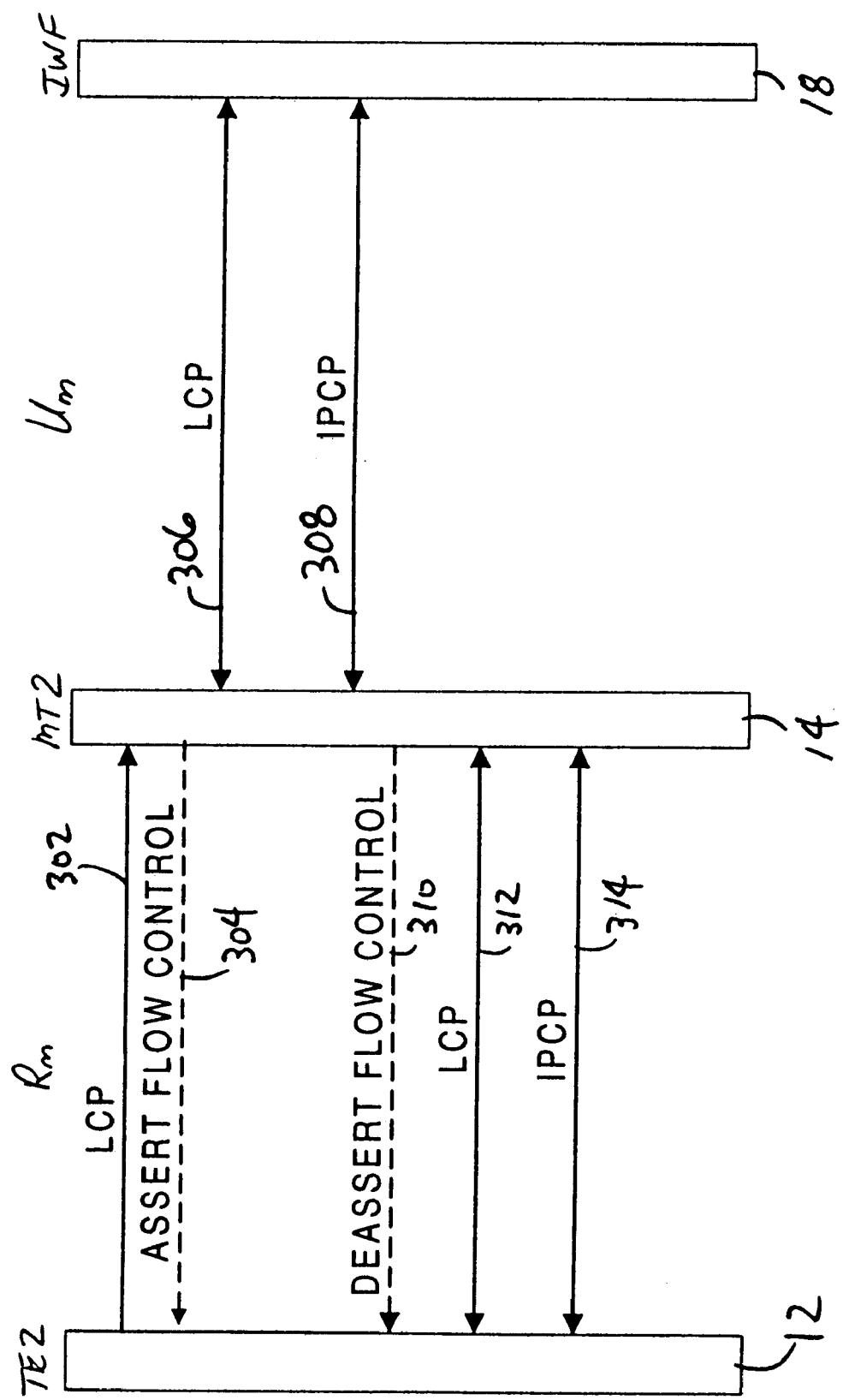
FIG. 3 is a protocol flow diagram.
Figure 4:
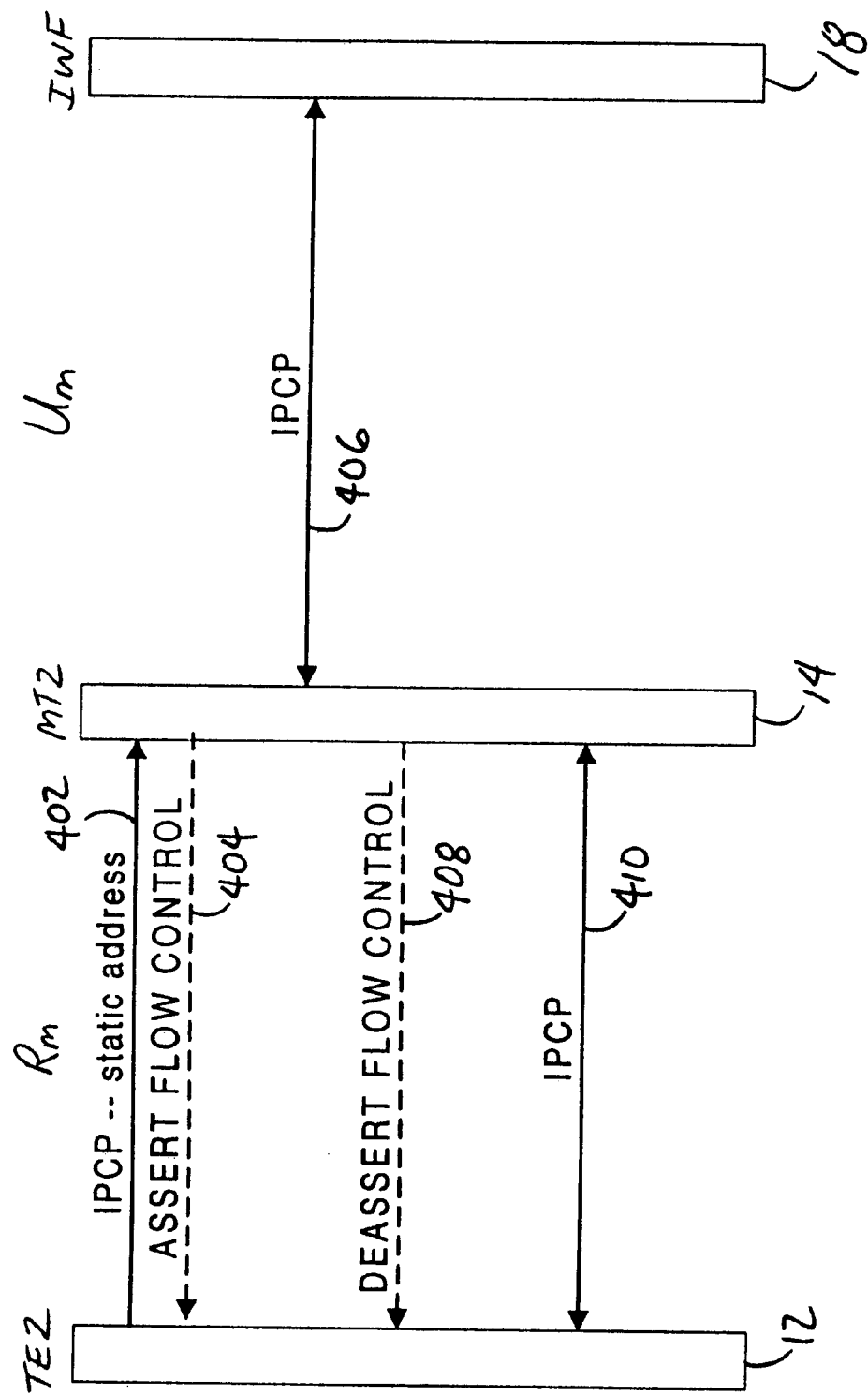
FIG. 4 is a protocol flow diagram.

FIGS. 3 and 4 comprise diagrams which illustrates the flow of a protocol for establishing a packet network call over a transmission link extending between a mobile terminal device 12 and an interworking function 18 via a wireless communication device 14. The transmission link connects mobile terminal device 12 to a wireless communication device 14 over a first interface which comprises the Rm interface, and further connects wireless communication device 14 to interworking function 18 over a second interface which comprises the Um interface. The packet network call, once established, comprises a first interface data link formed within a data link layer across the Rm interface, and a second interface data link formed within the data link layer across the Um interface.

Referring now to FIG. 3, the establishment of data and packet links between a mobile terminal device 12 and a network via interworking function 18 is initiated by mobile terminal device 12. More specifically, mobile terminal device 12 will send an LCP configure packet 302 to mobile communication device 14. Mobile communication device 14 will then forward an assert flow control communication 304 to mobile terminal device 12, at which point a flow control will be performed on mobile terminal device 12. During the flow control, wireless communication device 14 will then perform an LCP negotiation 306 with interworking function 18 to establish the Um (second) interface data link (a PPP link) with interworking function 18.

After the Um interface data link (PPP link) is established, and during the flow control, wireless communication device 14 will perform a network control protocol negotiation 308 with interworking function entity 18. More specifically, an IPCP negotiation 308 will be performed with interworking function 18 to establish a Um (second) interface network link (IP link within the network layer) carried by the second interface data link. One of the results of this negotiation will include an IP address which is assigned to identify mobile terminal device 12.

Subsequently, a deassert flow control communication 310 will be sent from wireless communication device 14 to mobile terminal device 12, at which point the flow control will be terminated. Then, an LCP negotiation 312 will be performed between mobile terminal device 12 and wireless communication device 14 to establish a PPP link which comprises the Rm (first) interface data link between wireless communication device 14 and mobile terminal device 12. After the Rm interface data link is established between wireless communication device 14 and mobile terminal device 12, mobile terminal device 12 will perform an IPCP negotiation 314 with wireless communication device 14 to establish a Rm (first) interface network link (an IP link within the network layer) carried by the Rm (first) interface data link, using the IP address obtained during the IPCP negotiation 308 between wireless communication device 14 and interworking function 18.

If a mobile IP call is being made by mobile terminal device 12, and wireless communication device 14 has mobility support, certain other communications are performed after the Rm (first) interface data link is established.

In the IPCP negotiation 314 shown in the protocol flow diagram of FIG. 3, the IP address most recently negotiated between the wireless communication device 14 and interworking function entity 18 is the IP address which is assigned for purposes of identifying mobile terminal device 12. Accordingly, if no intermediate communications are performed between the LCP negotiation 312 and the IPCP negotiation 314, the IP address assigned for identifying mobile terminal device 12 is the IP address which was obtained during the IPCP negotiation 308 across the Um interface between wireless communication device 14 and interworking function entity 18.

As shown in FIG. 4, when a mobile IP call is being made, mobile terminal device 12 will send an IPCP packet communication 402, including a request for a static address, to wireless communication device 14. This IPCP packet communication 402 occurs after the LCP communication 312 shown in the protocol flow diagram of FIG. 3. If mobile IP is supported by wireless communication device 14, wireless communication device 14 will assert a flow control on mobile terminal device 12 by forwarding an assert flow control communication 404. Thereafter, wireless communication device 14 will perform an IPCP renegotiation 406 with interworking function 18 using the static IP address and other options in the IPCP packet communication 402. After that renegotiation, wireless communication device will forward a deassert flow control communication 408 to mobile terminal device 12, at which point the flow control is deasserted. Then, an IPCP negotiation 410 will be performed between mobile terminal device 12 and wireless communication device 14. Accordingly, during the flow control, wireless communication device 14 performs an IPCP renegotiation in order to establish an IP link with interworking function 18 to reestablish the Um (second) interface network link (IP link) carried by the Um (second) interface data link using the static IP address. After the flow control, the mobile terminal device 12 performs an IPCP negotiation to form an IP link with wireless communication device 14 to establish the Rm (first) interface network link carried by the Rm (first) interface data link using the static IP address. Either or both the IPCP renegotiations 406 and 410 may be partial negotiations, as part of the IPCP negotiation could have occurred previously.

Wireless communication device 14 may assert and deassert a flow control on mobile terminal device 12 in a number of ways. By way of example in the illustrated embodiment, wireless communication device 14 asserts a flow control on mobile terminal device 12 by responding with a Configure-Nak comprising hint values that will cause mobile terminal device 12 to respond with other Configure-Request packets that are sure to be rejected by wireless communication device 14. This can be done until such time as the flow control is to be terminated, at which point a deassertion is caused by providing valid values to mobile terminal device 12 in order to complete the negotiation.

Figure 5:
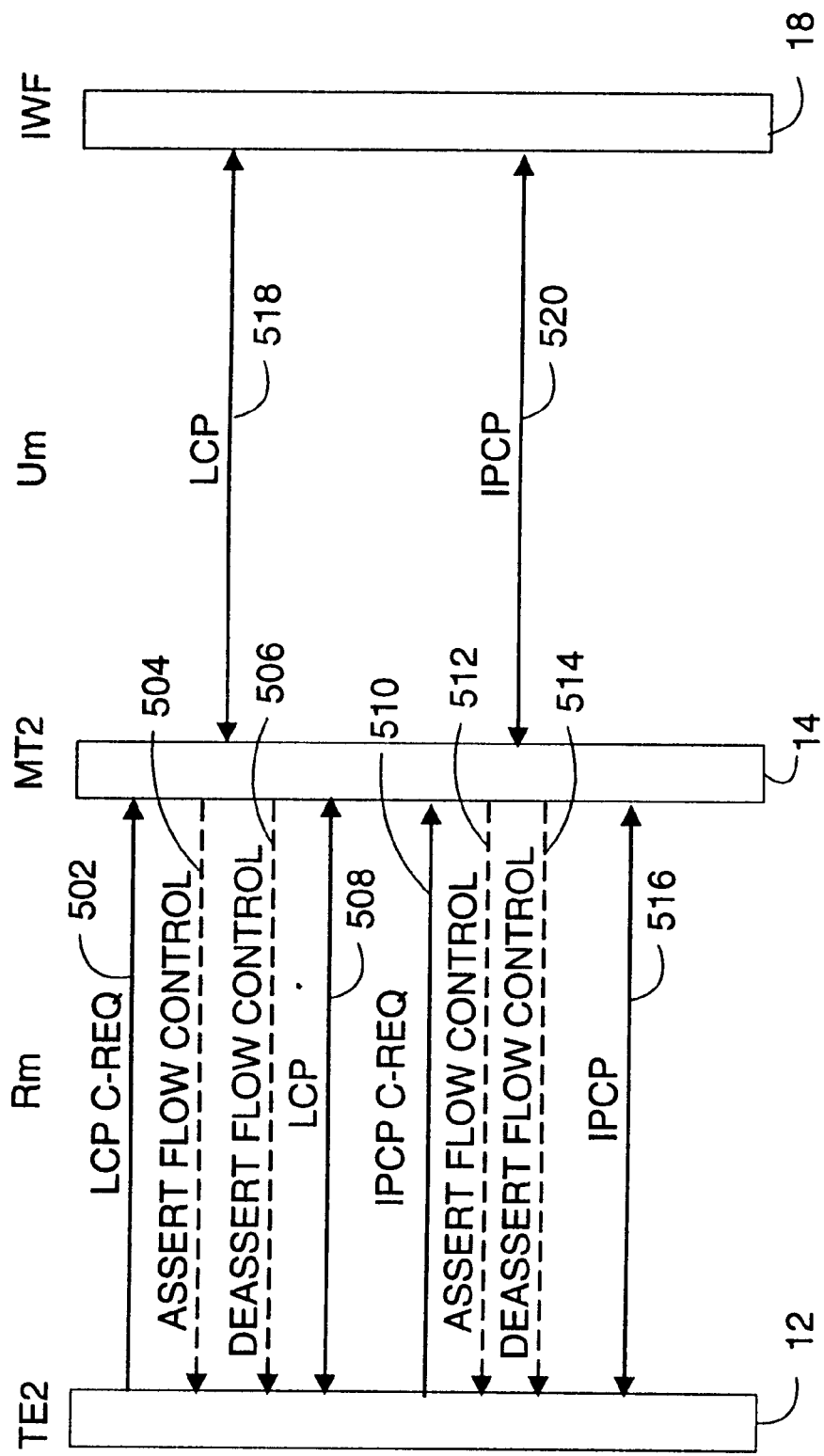
FIG. 5 is a protocol flow diagram per an alternate embodiment.

FIG. 5 illustrates the flow of a protocol for establishing a packet network call over a transmission link extending between mobile terminal device 12 and interworking function 18 via a wireless communication device 14. The transmission link connects mobile terminal device 12 to a wireless communication device 14 over a first interface which comprises the Rm interface, and further connects wireless communication device 14 to interworking function 18 over a second interface which comprises the Um interface. The packet network call, once established, comprises a first interface data link formed within a data link layer across the Rm interface, and a second interface data link formed within the data link layer across the Um interface.

The establishment of data and packet links between a mobile terminal device 12 and a network via interworking function 18 is initiated by mobile terminal device 12. More specifically, mobile terminal device 12 will send an LCP configure request packet 502 to mobile communication device 14. Mobile communication device 14 will then forward an assert flow control communication 504 to mobile terminal device 12, at which point a flow control will be performed on mobile terminal device 12. During this flow control, wireless communication device 14 will then perform an LCP negotiation 518 with interworking function 18 to establish the Um (second) interface data link (a PPP link) with interworking function 18. Then, a deassert flow control communication 506 is sent from wireless communication device 14 to mobile terminal device 12, at which point the flow control will be terminated. Then, an LCP negotiation 508 is performed between mobile device 12 and wireless communication device 14 to establish a PPP link which comprises the Rm (first) interface data link between wireless communication device 14 and mobile terminal device 12.

After the Rm interface data link is established between wireless communication device 14 and mobile terminal device 12, mobile terminal device 12 sends an IPCP configuration request packet 510 to wireless communication device 14. Mobile terminal device 14 then forwards an assert flow control communication 512 to mobile terminal device 12, at which point a flow control is performed on mobile terminal device 12. During that flow control, wireless communication device 14 performs an IPCP negotiation 520 with interworking function 18 to establish a Um (second) interface network link (IP link within the network layer) carried by the second interface data link One of the results of this negotiation will include an IP address which is assigned to identify mobile terminal device 12. Then, a deassert flow control communication 514 will be sent from wireless communication device 14 to mobile terminal device 12, at which point the flow control will be terminated. Thereafter, after the Rm interface data link is established between wireless communication device 14 and mobile terminal device 12, and after the Um interface network link is established between wireless communication device 14 and interworking function 18, mobile terminal device 12 will perform an IPCP negotiation 516 with mobile terminal device 12 to establish a Rm (first) interface network link (an IP link within the network layer) carried by the Rm (first) interface data link, using the IP address obtained during the IPCP negotiation 520 between wireless communication device 14 and interworking function 18. Of course, any of the negotiations shown in the protocol illustrated in FIG. 5 may be partial negotiations, as part of such negotiations could have occurred at earlier points in time.

While the invention has been described with reference to several illustrated embodiments, it is understood that the words which have been used herein are words of description, rather than words of limitation. Changes may be made, within the purview of the appended claims, without departing from the scope and spirit of the invention. Although the invention has been described herein with reference to particular materials, structures, and embodiments, it is understood that the invention is not to be limited to the particulars disclosed, but rather extends to all appropriate equivalent structures, methods, and uses.

What is claimed is:

1. A method for establishing a packet network call over a transmission link extending between a mobile terminal device and an interworking function, said transmission link connecting said mobile terminal device to a wireless communication device over a first interface and further connecting said wireless communication device to said interworking function over a second interface via a wireless link to a base station, said packet network call, once established, comprising a first interface data link formed within a predetermined data link layer across said first interface and a second interface data link formed within said predetermined data link layer across said second interface, said method comprising:

asserting and deasserting at one or more certain times a flow control on said mobile terminal device in response to a communication to the mobile terminal device from the wireless communication device;

during said flow control, said wireless communication device performing a link control protocol negotiation with said interworking function to establish said second interface data link with said interworking function;

after said second interface data link is established, and during a flow control on said mobile terminal device, said wireless communication device performing a network control protocol negotiation with said interworking function to establish a second interface network link carried by second interface data link, resulting in an IP address being assigned to identify said mobile terminal device;

after said second interface data link is established, said mobile terminal device performing a link control protocol negotiation with said wireless communication device to establish said first interface data link with said wireless communication device; and after said first interface data link is established and after said second interface network link is established, said mobile terminal device performing a network control protocol negotiation with said wireless communication device to establish a first interface network link carried by said second interface data link, using said IP address.

2. The method according to claim 1, wherein said second interface network link is established before said first interface data link is established.

3. The method according to claim 1, wherein said first interface data link is established before is said second interface network link established.

4. The method according to claim 1, further comprising other acts performed after said first interface data link and said second interface network link are both established, when said wireless communication device receives from said mobile terminal device a request for a static IP address, said other acts comprising:

during a flow control on said mobile terminal device, said wireless communication device performing a network control protocol renegotiation with said interworking function to reestablish said second interface network link carried by said second interface data link using said static IP address; and said mobile terminal device thereafter performing a network protocol negotiation with said wireless communication device to establish said first interface network link carried by said first interface data link using said static IP address.

5. The method according to claim 4, further comprising determining whether mobile IP is supported by said wireless communication device, and not performing said other acts when said mobile IP is not supported.

6. The method according to claim 5, wherein said mobile terminal device comprises an IS-707 TE2 device, said interworking function entity comprises an IS-707 IWF entity, and said wireless communication device comprises an IS-707 MT2 device, and wherein said first and second interfaces respectively comprise Rm and Um interfaces.

7. The method according to claim 4, wherein said interworking function comprises a gateway or bridge connection to a packet network.

8. The method according to claim 7, wherein said packet network comprises the Internet.

9. The method according to claim 1, wherein said transmission link comprises an IS-707 link in network model mode.

10. The method according to claim 9, wherein said first interface comprises an Rm interface.

11. The method according to claim 10, wherein said second interface comprises a Um interface.

12. The method according to claim 11, wherein said link control protocol negotiation comprises an LCP negotiation to create a PPP link.

13. The method according to claim 12, wherein said second interface data link comprises a PPP link.

* * * * *